United States Patent [19]

Suzuki et al.

[11] Patent Number: 5,739,602

[45] Date of Patent: Apr. 14, 1998

[54] METHOD OF AND DEVICE USING ADHESIVELY CONNECTED PARTS FOR PREVENTING MOTOR ROTATIONAL IMBALANCE CAUSED BY THERMAL EXPANSION

[75] Inventors: Mitsuo Suzuki; Yukio Itami, both of Yokohama; Wataru Ohtani, Sagamihara; Wataru Kashima, Ebina; Yoshihiro Takahashi, Sibata-gun; Noriyuki Kadowaki, Sendai, all of Japan

[73] Assignee: Ricoh Company, Ltd., Tokyo, Japan

[21] Appl. No.: 624,025

[22] Filed: Mar. 27, 1996

[30] Foreign Application Priority Data

Mar. 27, 1995 [JP] Japan .................. 7-067202

[51] Int. Cl.⁶ .................. H02K 7/00; H02K 1/22; G02B 26/08
[52] U.S. Cl. .................. 310/51; 310/46; 310/156; 310/262
[58] Field of Search .................. 310/51, 46, 156, 310/262; 359/200, 216, 217; 438/38, 35.7

[56] References Cited

U.S. PATENT DOCUMENTS

| | | | |
|---|---|---|---|
| 4,570,333 | 2/1986 | Jones | 29/598 |
| 4,691,998 | 9/1987 | Sakagaito et al. | 350/616 |
| 4,726,640 | 2/1988 | Iwama et al. | 350/6.8 |
| 4,727,134 | 2/1988 | Brunelle et al. | 528/371 |
| 4,791,020 | 12/1988 | Kokta | 428/326 |
| 4,814,625 | 3/1989 | Wright | 360/98.07 |
| 5,006,382 | 4/1991 | Squire | 428/35.7 |
| 5,069,515 | 12/1991 | Itami et al. | 359/200 |
| 5,200,662 | 4/1993 | Tagami et al. | 310/261 |
| 5,200,838 | 4/1993 | Nudelman et al. | 358/443 |
| 5,343,916 | 9/1994 | Duddey et al. | 152/5 |
| 5,500,994 | 3/1996 | Itaya | 29/598 |
| 5,573,824 | 11/1996 | Klocek et al. | 428/38 |
| 5,574,591 | 11/1996 | Suzuki et al. | 359/200 |

FOREIGN PATENT DOCUMENTS 4-25522  5/1992  Japan .

*Primary Examiner*—Steven L. Stephan
*Assistant Examiner*—Tran N. Nguyen
*Attorney, Agent, or Firm*—Woodcock Washburn Kurtz Mackiewicz & Norris LLP

[57] ABSTRACT

The current invention is directed to a high-speed optical deflector which includes a brushless motor operating in a high-temperature environment. The brushless motor components include rotatable parts made of various materials whose thermal expansion coefficients significantly vary. These rotational components include a steel rotor flange, a magnet rotor, and an aluminum shaft. To substantially eliminate rotational imbalance or vibration caused by the thermal expansion, the above described components are fixed with a certain adhesive which prevents these components from causing the rotational imbalance. A certain heat-resistant adhesive provides a sufficient structural strength to substantially minimize a rotational imbalance caused by the thermally expanding components in an operating temperature range.

15 Claims, 5 Drawing Sheets

FIG. IA
PRIOR ART
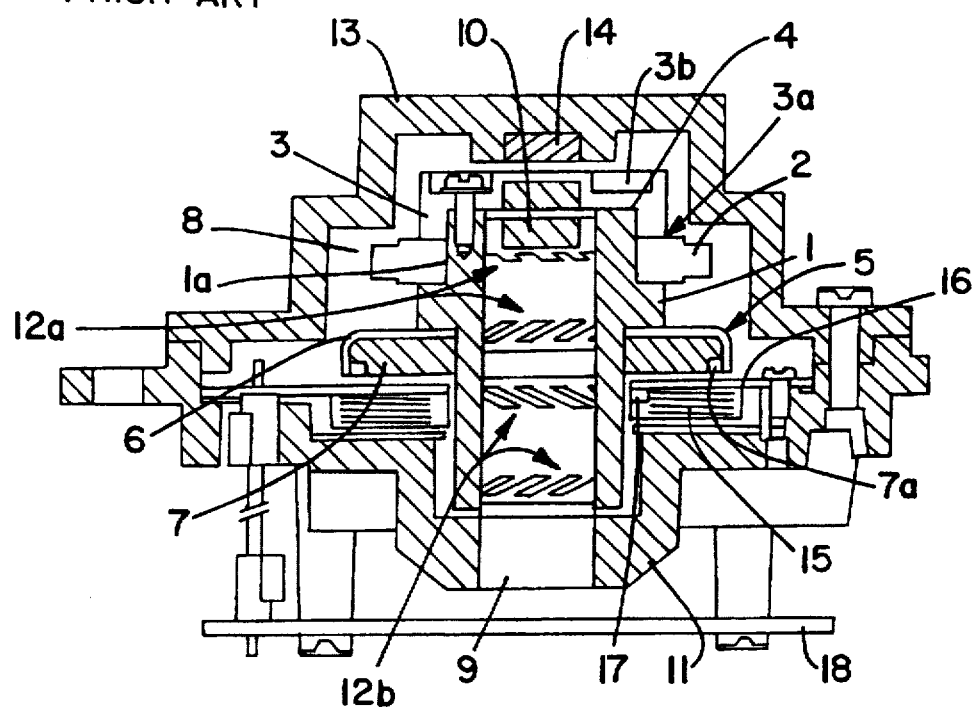

METHOD OF AND DEVICE USING ADHESIVELY CONNECTED PARTS FOR PREVENTING MOTOR ROTATIONAL IMBALANCE CAUSED BY THERMAL EXPANSION

FIELD OF THE INVENTION

The current invention is generally related to a precision motor operating in a high temperature environment and more particularly related to a noise prevention technique for the high-speed precision brushless motor operating at a high temperature.

BACKGROUND OF THE INVENTION

Optical data processing devices such as printers, copiers, scanners and facsimile machines includes an optical deflector for deflecting a laser beam on a rotatable polygon mirror. Generally, these optical deflectors consists of a brushless motor and a polygon mirror directly mounted on the rotatable shaft of the motor. The polygon mirror rotates at a high speed over 20,000 rotation per minute (RPM) for continuously reading and writing information via deflected laser light. The more detail descriptions of the brushless motor type optical deflector are found in prior art publications such as U.S. Pat. No. 4,726,640 issued to Iwama et al. and Japanese Patent No. 4-25522.

Referring to FIG. 1A, the above described brushless motor type optical deflector is shown in a cross sectional view. A brushless motor housing 13 houses rotatable elements including a polygon mirror 2, a mirror holder 3, a rotatable shaft 1, a magnet 7, a rotor flange 6, a coil 15, and a printer circuit 16. The rotating shaft 1 is rotated in a predetermined direction by a torque generated between the magnet 7 and the coil 15. In general, the rotational speed of the brushless motor is controlled by adjusting the amount of current flowing through the coil 15. For the optical deflector use, the rotational speed is maintained at approximately 20,000 rotations per minute (RPM). Because of the high rotational speed, the motor generates heat to raise the operating temperature. Furthermore, the optical deflector is generally placed in a high temperature environment of the optical data processing machines such as copiers and printers.

The hollow rotatable shaft 1 is disposed over a fixed shaft 9 so that at a certain rotating speed, the rotatable shaft is lift due to a thrust pneumatic bearing. The dynamic uplifting pressure of the pneumatic bearing is generated by an air flow entering into the rotating shaft 1 through herringbone grooves 12b located near the bottom of the rotating shaft 1, travelling inside the rotating shaft towards the top and exiting through herringbone grooves 12a located near the top of the rotating shaft 1. The above described uplifting pressure is counter balanced by a repulsion force between a magnet 14 located at the top of the housing and magnets 4 and 10 located at the top of the rotatable shaft 1.

The polygon mirror 2 is directly mounted on the shaft 1 below the mirror holder 3. The polygon mirror and the shaft 1 are generally made of aluminum. The top surface of the polygon mirror 2 contacts the mirror holder 3 while the bottom surface of the polygon mirror 2 contacts a projection part on the shaft 1. Since these parts are made of the generally same material, thermal expansion coefficients of these parts are also substantially similar. Thus, even under a high temperature operating condition, these parts do not generally contribute to a rotational imbalance due to thermal expansion.

In contrast, the magnet 7 and a steel rotor flange 6 generally contribute to a rotational imbalance. One of the reasons why the these components cause the rotational imbalance is that they expand at a different rate than the aluminum shaft 1 under a high temperature condition. Both the magnet 7 and is that they expand at a different rate than the aluminum shaft 1 under a high temperature condition. Both the magnet 7 and the steel rotor flange 6 are directly mounted on the shaft 1 and contact the shaft 1. The thermal coefficient for aluminum is approximately $2.3 \times 10_{-3}$ while those for magnet and steel are respectively approximately $4.5 \times 10^{-5}$ and $1.1 \times 10^{-5}$. However, these different thermal expansion characteristics alone do not necessarily cause the above described rotational imbalance at a high temperature.

Referring to now to FIG. 1B, a top view of the rotor flange 6 is shown in relation to a cross sectional view of the shaft 1. Although the steel rotor flange 6 is press fit on the shaft 1, the steel rotor flange 6 has a bore that is slightly larger than the outer diameter of the shaft 1. Underneath the rotor flange 6, the magnet 7 is placed and also has the slightly larger bore to accommodate the shaft 1. In other words, the rotor flange 6 and the magnet 7 are misaligned by approximately over 10 microns. Because of the above described slight misalignment of the flange 6 and the magnet 7 with respect to the shaft 1, when the brushless motor operates at a high temperature, the above noted thermal expansion characteristics worsen the misalignment and causes the rotational imbalance.

Referring to FIG. 1C, a cross sectional view of the flange 6, the magnet 7 and the shaft 1 illustrates that various thermal expansion forces deteriorate the alignment and cause the above described rotational imbalance. Although the shaft 1, the rotor flange 6 and the magnet 7 are fixedly positioned by an adhesive, at a high temperature during rotation, the thermal expansion at various rates among these components place them in a misaligned position with respect to other components. As a result of the increased misalignment, certain components increase friction against other components or rotate off balance. Thus, the motor generates undesirable noise due to the above described misalignment.

In the prior attempts, the rotational balance is adjusted by a rotation adjustment screw 3b or an adjustment groove 7a. Generally, after the flange 6, the magnet 7 are mounted on the shaft 1 and fixed by an adhesive, the brushless motor is adjusted to improve its rotational balance by shifting some weight. This can be done by adjusting the rotational adjustment screw 3b and or by placing an additional amount of adhesive in the adjustment groove to counter balance the weight causing the imbalance during the rotation. However, generally, these adjustments are made at a room temperature and do not take care of thermal expansion in the high temperature environment. As a result, the use of the brushless motor in the optical deflector causes undesirable noise due to the rotational imbalance caused by the thermal expansion.

SUMMARY OF THE INVENTION

To solve the above described as well as other problems, according to one aspect of the current invention, a motor operating at a high temperature includes a first rotatable part made of a fist material having a first thermal coefficient; a second rotatable part made of a second material having a second thermal coefficient, at least a portion of the second rotatable part engaging the first part for rotating together, the portion defining an overlap area, the second rotatable part being disposed at a predetermined position with respect to the first rotatable part so as to maintain balance during rotation; and adhesive placed in the overlapping area between the first rotatable part and the second rotatable part to maintain the predetermined position at the high temperature so as to substantially eliminate rotational imbalance caused by a difference in thermal expansion of the first rotatable part and the second rotatable part.

According to a second aspect of the current invention, a brushless motor includes a disk shape magnet rotor having a circular groove located at a concentrically equal distance from a center of the disk;an aluminum shaft engaging the disk in a perpendicular direction through the center of the disk for rotating together with the rotor, an area of contact between the rotor and the shaft defining an engagement area; and adhesive placed in the groove for maintaining a rotational balance of the rotor and the shaft during the rotation at a high temperature so as to prevent noise generated by the imbalance.

According to a third aspect of the invention, a method of maintaining a rotational balance in a brushless motor operating in a high temperature environment, includes the following steps of: a) placing a first rotatable part made of a fist material having a first thermal coefficient in the brushless motor; b) placing a second rotatable part made of a second material having a second thermal coefficient in the brushless motor, at least a portion of the second rotatable part engaging the first part for rotating together, the portion defining an overlap area, the second rotatable part being disposed at a predetermined position with respect to the first rotatable part so as to maintain balance during rotation; and c) placing adhesive in the overlapping area between the first rotatable part and the second rotatable part to maintain the predetermined position at the high temperature so as to substantially eliminate rotational imbalance caused by a difference in thermal expansion of the first rotatable part and the second rotatable part.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1A illustrates a cross sectional view of an optical deflector including a brushless motor.

DETAILED OF THE PREFERRED EMBODIMENT(S)

Figure 2A:
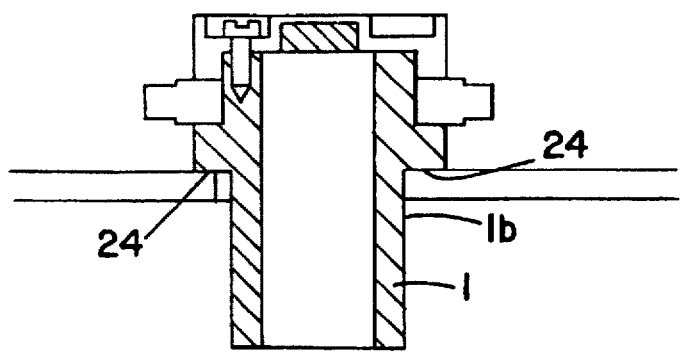
FIG. 2A illustrates a cross sectional view of a shaft assembly with a polygon mirror with respect to adhesive application surfaces according the current invention.

Referring to FIG. 2A, a cross sectional view of a shaft 1, a polygon mirror holder 3 and a polygon mirror 2 are shown in relation to an rotor attachment surface 24. According to one preferred embodiment, the shaft 1, the polygon mirror holder 3 and a polygon mirror 2 are made of aluminum. The polygon mirror 2 is placed on a projection 1b and held down by a polygon mirror holder 3. Since these three components are made of an identical or substantially similar material, even at a high temperature, they do not cause rotational imbalance due to thermal expansion. On the other hand, the rotor assembly attachment surface 24 is joined to a part that is not the identical or substantially similar material.

Figure 2B:
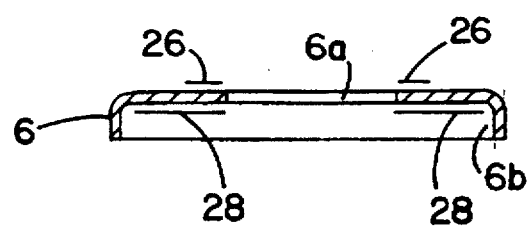
FIG. 2B illustrates a cross sectional view of a rotor flange with respect to adhesive application surfaces according the current invention.
Figure 2C:
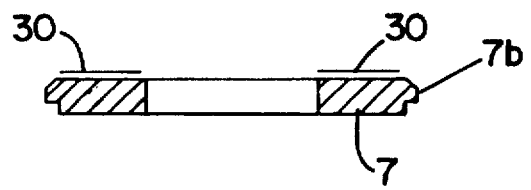
FIG. 2C illustrates a cross sectional view of a magnet with respect to adhesive application surfaces according the current invention.
Figure 1B:
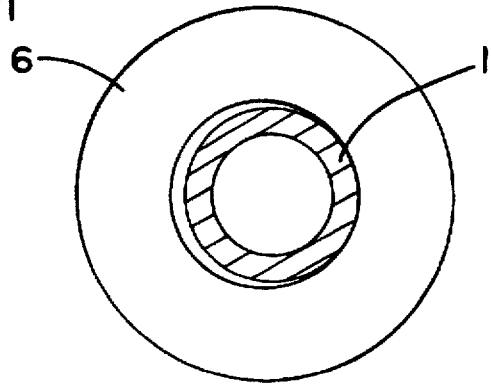
FIG. 1B illustrates a top view of a spatial relation between a shaft and a rotor flange.

Now referring to FIGS. 2B and 2C, according to one preferred embodiment, cross sectional views of a steel rotor flange 6 and a magnet 7 are shown. The rotor flange has a central bore 6a where the shaft 1 of FIG. 2A is press fit. The diameter of the bore is larger than that of the shaft diameter near the rotor assembly attachment surface 24 by approximately 10 microns. Similarly, the magnet 7 also has a central bore 7a of the comparable size. The magnet 7 is assembled into the rotor flange 6. In the assembled position, a lateral portion 6b of the rotor flange 6 protects a lateral portion 7b of the magnet.

To fixedly place the magnet 7 in the rotor flange 6, a heat resistant adhesive is applied to either or both an inner surface 28 of the rotor flange and an outer surface 30 of the magnet 7 according to the current invention. The assembled rotor and magnet are joined to the shaft 1 by the same heat resistant adhesive between the contact surface 24 and an outer surface 26 of the rotor flange. Similarly, the heat resistant adhesive may be applied to either or both surfaces 24 and 26.

According to other preferred embodiments of the current invention, the heat resistant is used only in some of the above described application surfaces. In other words, according to an alternative embodiment, the heat resistant adhesive is used only between the flange and the magnet. According to another alternative embodiment, the heat resistant adhesive is used only between the shaft and the flange. The heat resistant adhesive as applied in the above described manners fixedly joins the components made of different material and minimizes the undesirable effect of various thermal expansion such as an increased noise level by substantially reducing the thermal expansion forces under a high temperature operating condition.

Figure 3A:
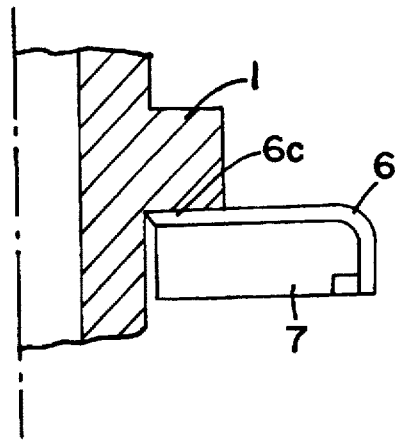
FIG. 3A illustrates a cross sectional view of one preferred embodiment of a rotor flange for trapping excess adhesive according to the current invention.
Figure 3B:
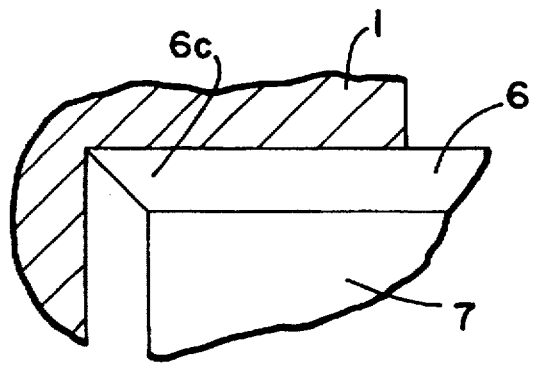
FIG. 3B is an enlarge view of FIG. 4A near the trapping area.

Now referring to FIGS. 3A and 3B, the above described adhesive applying surfaces 26, 28 and 30 are located adjacent to the bore 6a or 7a, when the flange 6 and the magnet 7 are joined the shaft 1, some of excess heat resistant adhesive is squeezed out towards a space 8 formed between the shaft 1 and the magnet 7. To effectively trap the excess adhesive in the trap 8, one end of the rotor flange 6 facing the shaft 1 is cut at approximately 45° according to a preferred embodiment. The slanted end of the flange 6c also provides an additional surface for the heat resistant adhesive to structurally strengthen the joint area among the rotor flange 6, the shaft 1 and the magnet 7 as indicated by an stippled area in FIG. 3B.

Figure 4:
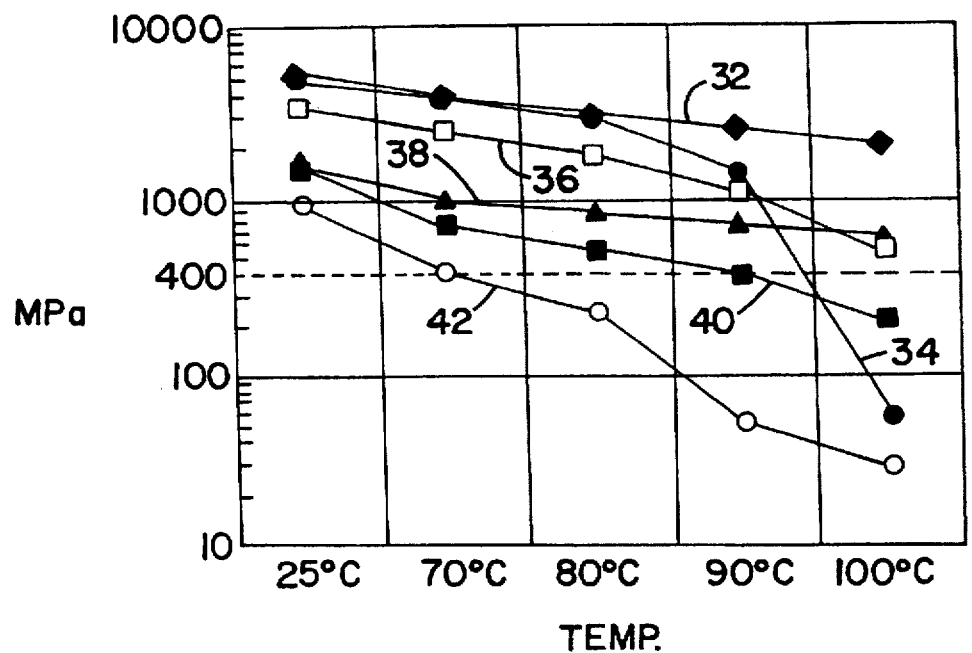
FIG. 4 is a graph illustrating differences in strength among adhesives over a temperature range.

Referring to FIG. 4, some heat resistant adhesives for the use in the current invention are compared for their strength in mega Pascal over a temperature range. According to the current invention, a preferred heat resistant adhesive has Young's modulus at approximately 400 mega Pascal (MPa) or larger around 90° C. Lines 32, 34, 36, 38, 40, 42 respectively indicate an epoxy-based adhesive B, an epoxy-based adhesive A, an epoxy-based adhesive C, an acrylic-based adhesive B, an acrylic-based adhesive A, and an acrylic-based adhesive C. When the above adhesives are used for assembling the above described components in brushless motors, there was no noticeably increased imbalance when they are operated at 25° C. However, when the motors are operated at 70° C., there was an increased imbalance by a motor with the acrylic-based adhesive C. Similarly, at 90° C., a comparable imbalance was observed for the acrylic-based adhesive A. Assuming that the operating temperature of the brushless motor does not exceed 90° C., except for the above two adhesives, other tested adhesives successfully maintained an acceptable balance or noise level.

Figure 5:
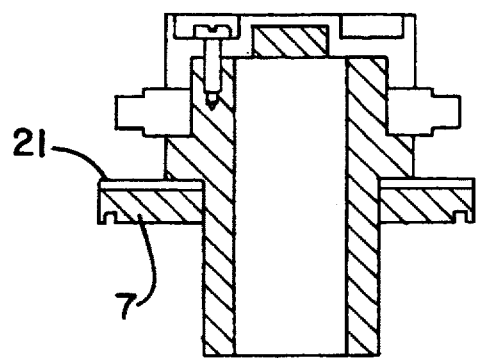
FIG. 5 illustrates a cross sectional view of a second preferred embodiment.

According to another aspect of the current invention, the adhesive is selected to have substantially the same thermal expansion coefficient as a component to which the adhesive is applied. For example, an epoxy-based adhesive having a thermal expansion coefficient of $4.0 \times 10-5$ a ferrite plastic magnet has an approximate thermal expansion coefficient of $4.5 \times 10^{-5}$ Referring to FIG. 5, according to another embodiment of the current invention, a rotor flange 21 does not have an equivalent structure to a side 6c of FIG. 2B. Although the rotor flange 21 does not protect the distal end of the magnet 7, the magnet 7 contains metal such as aluminum manganese. The thermal expansion coefficient of the magnet containing aluminum manganese is approximately $1.8 \times 10^{-5}$ and is between those of steel and aluminum. Because of this thermal expansion, the magnet 7 exert substantially less thermal expansion force on the heat resistant adhesive. In addition, because of the sufficient hardness, a groove is constructed on the bottom surface of the magnet. According to this embodiment the groove is located at a predetermined distance from a distal end of the magnet. This groove is used in placing adhesive so as to balance the rotational rotor assembly.

Figure 6A:
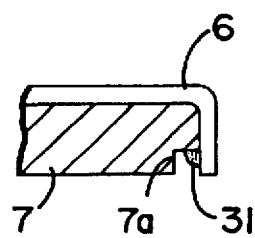
FIG. 6A illustrates a cross sectional view of prior art application of an adhesive in a groove.
Figure 6B:
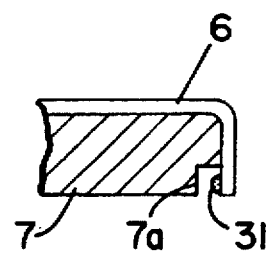
FIG. 6B illustrates a cross sectional view of one preferred method of applying an adhesive in a groove.
Figure 6C:
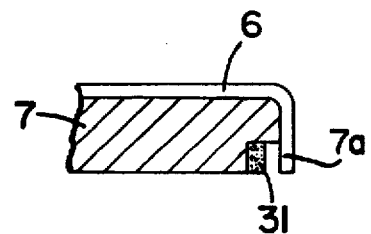
FIG. 6C illustrates a cross sectional view of a second preferred method of applying an adhesive in a groove.

Referring to FIGS. 6A, 6B and 6C, the heat resistant adhesive 31 is placed in the groove 7a. The heat resistant adhesive 31 is placed in the groove 7a in order to correct the rotational balance. According to one preferred embodiment, the groove 7a is defined by a lateral side of the steel flange 6 and the magnet. Referring to FIG. 6A, the heat resistant adhesive 31 is conventionally placed on both surfaces of the lateral side of the flange 6 and the magnet 7. This placement conducts heat on the adhesive 31 from two separate surfaces having different thermal expansion coefficients as well as different thermal conductance. Because of these differences, the adhesive 31 experiences non-uniform forces. As a result, the adhesive 31 tends to come off the groove surfaces 7a.

Still referring to FIGS. 6B and 6C, the adhesive 31 is respectively placed either on the lateral side of the flange 6 or the magnet 7 according to preferred embodiments the current invention. Since the adhesive contacts a uniform surface, the adhesive also experiences a uniform force and tends to stay affixed on the surface.

Figure 7:
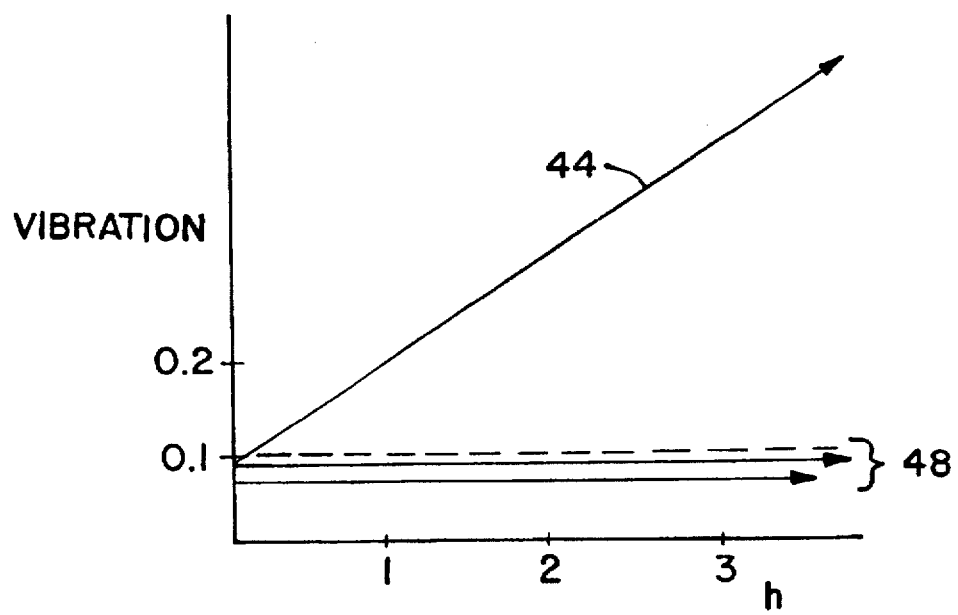
FIG. 7 is a graph illustrating the effect of the heat resistant adhesive in maintaining minimum vibration over time.
Figure 1C:
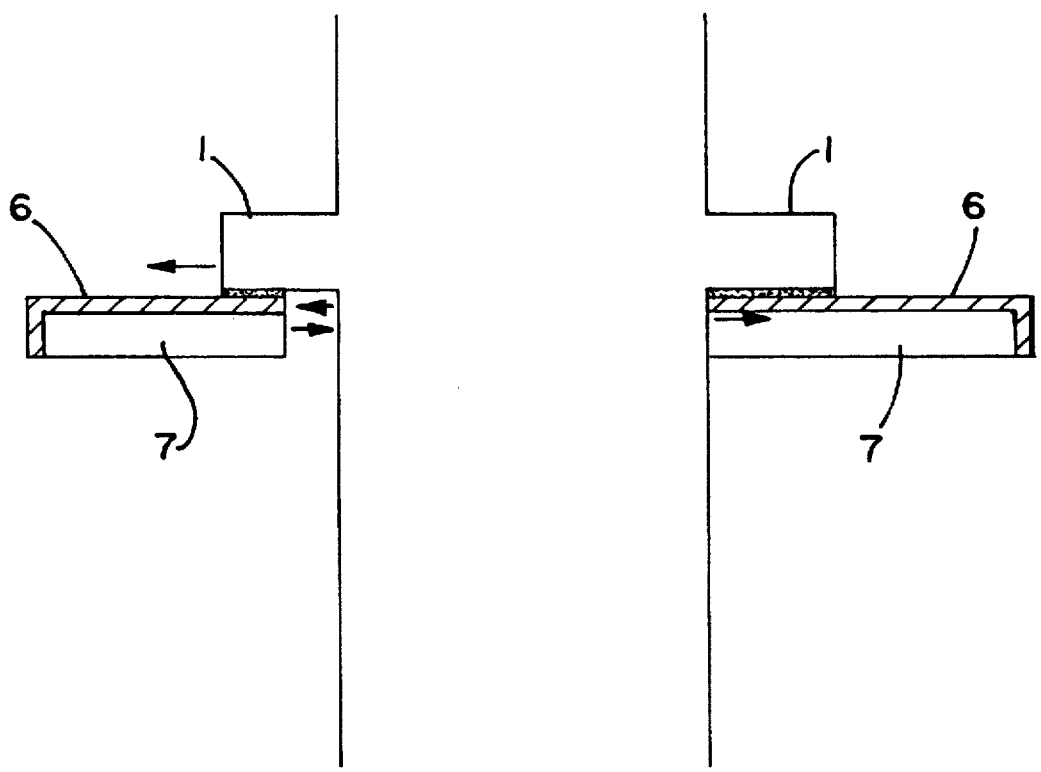
FIG. 1C is a schematic diagram of thermal expansion forces exerted on the components of a brushless motor.

Referring to FIG. 7, the use of the above described heat resistant adhesive in a brush-less motor for an optical deflector substantially reduces the vibration which develops over time. A line 44 illustrates an increasing vibrational amount of a brush-less motor whose components are not joined by the above described heat-resistant adhesive. Lines 48 indicate that the vibrational level of the brushless motor whose components are joined by the above described heat resistant adhesive is substantially maintained at the initial level over time.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A motor operating at a high temperature, comprising:
   a first rotatable part made of a fist material having a first thermal expansion coefficient;
   a second rotatable part made of a second material having a second thermal expansion coefficient, at least a portion of said second rotatable part engaging said first rotatable part for rotating together, said portion defining an overlapped area, said second rotatable part being disposed at a predetermined position with respect to said first rotatable part so as to maintain balance during rotation; and
   adhesive placed in said overlapped area between said first rotatable part and said second rotatable part to maintain said predetermined position at the high temperature so as to substantially eliminate rotational imbalance caused by a difference in thermal expansion of said first rotatable part and said second rotatable part said adhesive having at least 400 Mega Pascal (MPa) for Young's modulus at 90 degrees Celsius.

2. The motor operating at a high temperature according to claim 1 wherein said first rotational part is a rotor made of magnet.

3. The motor operating at a high temperature according to claim 2 wherein said rotor and said adhesive have the substantially same thermal expansion coefficient of approximately $4.5 \times 10^{-5}$.

4. The motor operating at a high temperature according to claim 2 wherein said second rotational part is a rotatable shaft made of aluminum.

5. The motor operating at a high temperature according to claim 2 wherein said second rotational part is a flange made of steel.

6. The motor operating at a high temperature according to claim 1 wherein said first rotatable unit and said second rotatable unit rotate at a rate of approximately 20,000 revolution per minute.

7. An axial gap type brushless motor, comprising:

a disk shape magnet rotor having a circular groove located at a concentrically equal distance from a center of the disk;

an aluminum shaft engaging said disk in a perpendicular direction through the center of said disk for rotating together with said rotor, an area of contact between said rotor and said shaft defining an engagement area; and adhesive placed in said groove for maintaining a rotational balance of said rotor and said shaft during the rotation at a high temperature so as to prevent noise generated by the imbalance, said adhesive having at least 400 Mega Pascal (MPa) for Young's modulus at 90 degrees Celsius.

8. The axial gap type brushless motor according to claim 7 wherein said rotor and said shaft rotates approximately at 20,000 rotation per minute (rpm) over 90° C.

9. The axial gap type brushless motor according to claim 7 wherein said rotor is made of aluminum manganese magnet.

10. The axial gap type brushless motor according to claim 7 wherein said rotor is made of ferrite plastic magnet having a thermal expansion coefficient of approximately $4.5 \times 10^{-5}$.

11. The axial gap type brushless motor according to claim 10 wherein said adhesive is epoxy-based and has a substantially same thermal expansion coefficient as said rotor.

12. The axial gap type brushless motor according to claim 7 further comprising a steel flange placed over said rotor, said flange rotating together with said rotor.

13. The axial gap type brushless motor according to claim 12 wherein said adhesive is also place between said flange and said rotor for maintaining a predetermined relative position between said rotor and said flange so as to substantially eliminate imbalance during rotation at a high temperature.

14. The axial gap type brushless motor according to claim 7 wherein said steel flange has a lateral protection side which covers a distal end of said magnet.

15. The axial gap type brushless motor according to claim 7 wherein said adhesive is also placed in said engagement area for maintaining a predetermined relative position between said rotor and said shaft so as to substantially eliminate imbalance during rotation at a high temperature.

* * * * *